(12) United States Patent
Leermann et al.

(10) Patent No.: US 11,180,684 B2
(45) Date of Patent: Nov. 23, 2021

(54) CABLE-WRAPPING TAPE

(71) Applicant: certoplast Technische Klebebaender GmbH, Wuppertal (DE)

(72) Inventors: Timo Leermann, Wuppertal (DE); Andreas Franz Hohmann, Wuppertal (DE)

(73) Assignee: CERTOPLAST TECHNISCHE KLEBEBAENDER GMBH, Wuppertal (DE)

( * ) Notice: Subject to any disclaimer, the term of this patent is extended or adjusted under 35 U.S.C. 154(b) by 3 days.

(21) Appl. No.: 16/326,274

(22) PCT Filed: Aug. 25, 2017

(86) PCT No.: PCT/EP2017/071415
§ 371 (c)(1),
(2) Date: Mar. 6, 2019

(87) PCT Pub. No.: WO2018/046315
PCT Pub. Date: Mar. 15, 2018

(65) Prior Publication Data
US 2019/0218428 A1   Jul. 18, 2019

(30) Foreign Application Priority Data

Sep. 9, 2016   (DE) .......................... 202016104995.4

(51) Int. Cl.
| | |
|---|---|
| C09J 11/06 | (2006.01) |
| C09J 7/21 | (2018.01) |
| C09J 7/38 | (2018.01) |
| C09J 7/24 | (2018.01) |
| C09J 7/25 | (2018.01) |
| C09J 7/22 | (2018.01) |
| C08K 9/00 | (2006.01) |
| C08K 11/00 | (2006.01) |
| A01M 29/12 | (2011.01) |
| A01N 25/12 | (2006.01) |
| A01N 25/28 | (2006.01) |
| A01N 65/38 | (2009.01) |
| A01N 65/48 | (2009.01) |
| C08K 7/16 | (2006.01) |
| C08K 9/10 | (2006.01) |

(52) U.S. Cl.
CPC .............. *C09J 11/06* (2013.01); *A01M 29/12* (2013.01); *A01N 25/12* (2013.01); *A01N 25/28* (2013.01); *A01N 65/38* (2013.01); *A01N 65/48* (2013.01); *C08K 7/16* (2013.01); *C08K 9/10* (2013.01); *C08K 11/00* (2013.01); *C09J 7/21* (2018.01); *C09J 7/22* (2018.01); *C09J 7/24* (2018.01); *C09J 7/243* (2018.01); *C09J 7/245* (2018.01); *C09J 7/25* (2018.01); *C09J 7/385* (2018.01); *C09J 2203/302* (2013.01); *C09J 2301/408* (2020.08); *C09J 2301/41* (2020.08); *C09J 2400/263* (2013.01); *C09J 2423/00* (2013.01); *C09J 2433/00* (2013.01); *C09J 2471/00* (2013.01); *C09J 2475/00* (2013.01); *C09J 2483/00* (2013.01)

(58) Field of Classification Search
None
See application file for complete search history.

(56) References Cited

U.S. PATENT DOCUMENTS

| | | | | |
|---|---|---|---|---|
| 5,322,862 | A * | 6/1994 | Kurata | A01N 25/28 424/408 |
| 7,287,489 | B1 * | 10/2007 | O'Brien | A01K 15/02 119/712 |
| 2007/0093392 | A1 * | 4/2007 | Vavra | A01N 65/00 504/367 |
| 2010/0129650 | A1 * | 5/2010 | Mayan | C09J 7/21 428/339 |
| 2015/0203721 | A1 | 7/2015 | Rambusch | |
| 2015/0351379 | A1 | 12/2015 | Lyons | |
| 2016/0128950 | A1 | 5/2016 | Mitroo | |
| 2017/0051137 | A1 * | 2/2017 | Dussich | A01N 25/10 |

FOREIGN PATENT DOCUMENTS

| | | |
|---|---|---|
| DE | 3538706 B | 2/1987 |
| DE | 19900502 A | 10/1999 |

* cited by examiner

*Primary Examiner* — Frank D Ducheneaux
(74) *Attorney, Agent, or Firm* — Andrew Wilford

(57) ABSTRACT

The invention relates to a cable wrapping tape for wrapping cables in motor vehicles, comprising a tape-shaped carrier and an adhesive coating on at least one side of said carrier, and characterised in that the adhesive coating and/or carrier are provided with an incorporated repellent against, in particular, mammal bites.

6 Claims, No Drawings

CABLE-WRAPPING TAPE

CROSS REFERENCE TO RELATED APPLICATIONS

This application is the US-national stage of PCT application PCT/EP2017/071415 filed 25 Aug. 2017 and claiming the priority of German patent application 202016104995.4 itself filed 9 Sep. 2016.

FIELD OF THE INVENTION

The invention relates to a cable-wrapping tape for wrapping cables in a motor vehicle, having a substrate strip and an adhesive coating on at least one face of the substrate strip.

BACKGROUND OF THE INVENTION

Such a cable-wrapping tape became known for example through DE 20 2012 103 754 [US 2015/0203721]. Such cable-wrapping tapes are in fact generally used to combine multiple cables in automobiles by wrapping or sheathing. To do so, the cable-wrapping tape in question is usually wrapped in a helix around the cables to be combined. However, a hose-like wrapping is also possible.

Based on the described purpose, it is important on the one hand for the relevant cable-wrapping tapes for wrapping cables in a motor vehicle that the cable-wrapping tapes in question are resistant to elevated temperatures, oil, gasoline, and so on, because the cables in question are often placed in the engine compartment. In addition and on the other hand, usually low tear strengths in the transverse direction are required for working with such cable-wrapping tapes in order to achieve a transverse tear-by-hand capability.

In regard to cables in automobiles or general motor vehicle parts in automobiles made of rubber or plastic, as they are typically found in the engine compartment, there is always a problem in the fact that damage is caused by small carnivores. Such bite and scratch damage is found for example on coolant hoses, rubber sleeves, noise-damping panels as well as electric cables, such as ignition cables. Weasels are primarily suspected as being the main cause.

For this reason, prior art according to DE 35 38 706 already proposes a cover for motor vehicle parts to prevent damage caused by animal bites or scratches where the cover consists of a plastic layer or plastic film that contains a repellent. The repellent in question is an active ingredient that in the described situation is detected by the olfactory or gustatory senses of the relevant mammal and deters the mammal without killing it.

According to the teaching pursuant to DE 35 37 706 [35 38 706], the addressed motor vehicle parts may also involve ignition cables provided with a cover. This cover is one out of a plastic film in a hose shape. In this example, the hose is provided with a longitudinal slit and its entire length can then be pushed onto the ignition cable. The plastic film is thus provided with the repellent in question. This is time-consuming overall.

OBJECT OF THE INVENTION

The object of the invention is to further develop such a cable-wrapping tape to wrap cables in automobiles in such a manner that effective and simply constructed protection is provided against mammal bites in particular.

SPECIFIC DESCRIPTION OF THE INVENTION

To attain this object, a generic cable-wrapping tape for wrapping cables in automobiles within the scope of the invention is characterized in that the adhesive coating and/or the substrate strip are/is provided with the applied repellent against mammal bites in particular.

Therefore, within the scope of the invention, the cable-wrapping tape in question for wrapping automobile cables is furnished directly with the repellent against mammal bites in particular. An additional coating addressed in prior art pursuant to DE 35 38 706 or an additional hose to be applied may also be explicitly omitted, which decreases complexity. Instead, the cable-wrapping tape usually used anyway in this context is additionally furnished according to the invention with the repellent in question and imbued with the desired additional benefits.

Generally, the repellent can be incorporated in a pure, dissolved, dispersed and/or microencapsulated form into the adhesive coating or the substrate strip. In other words, the above-described forms of application are to be considered both as alternatives as well as in combination. For example, the repellent may be a powder that is incorporated into a composition from which the adhesive is made. For an adhesive, one can use a dispersion that for example according to the invention is also provided with the repellent in a powder form. Like the original dispersion, the adhesive-making composition produced in this manner can then be sprayed, scraped on or applied by other means to the substrate strip in question. The relevant dispersion may involve one based on acrylate.

One proceeds in a similar manner in the event that a hot-melt adhesive is used as the adhesive. This hot-melt adhesive may be manufactured on the basis of an acrylate or rubber. In this case, too, the repellent can be incorporated as a powder into the hot-melt adhesive in question in a simple and cost-effective manner, and be applied along with it by for example a spray nozzle to the substrate strip. Basically as an alternative or in addition, one can use adhesives such as those based on silicone, polyurethane, polyether and polyolefin. In each case, processing and supplying a suitable composition for manufacturing the adhesive coating according to the invention is achieved in a particularly simple and cost-effective manner when the repellent in the example case is supplied to the adhesive-making composition in question as a powder and incorporated into the composition.

The same applies similarly in the event that the repellent is incorporated into the adhesive-making composition in a microencapsulated form. In this case, too, the processing of the adhesive-making composition can be undertaken and executed as a dispersion or hot-melt adhesive in a comparable manner as described earlier. In both cases, adding the repellent changes almost nothing in the manufacture of the adhesive coating, which is why one can expect low manufacturing costs. These can essentially be reduced to the cost of the additional material used for the repellent.

This applies all the more when, based on an advantageous design, a natural product is generally used as a repellent. Such natural products have the particular advantage that they typically emit strong or disagreeable odors and/or cause a burning on the mucous substances when used as flavoring agents. The advantage of such natural products lies in the fact that they are not toxic and physiologically harmless, in other words ideal for use in manufacturing cable-wrapping tapes for wrapping cables in automobiles. This is because such cable-wrapping tapes are generally worked with manually so that when resorting to natural products here, a health risk can be excluded and a high degree of acceptance can be expected.

Substances based on paprika, pepper or ginger have proven to be particularly favorable as suitable natural products in this context. These natural products are not only inexpensively available in large quantities, but they can be easily worked with, for example in the described powder form or also in an aqueous or alcoholic solution. In this case, the solution in question is incorporated into the adhesive-making composition.

However, as an alternative or in addition, the repellent in question can also be incorporated into a composition from which the strip is made. This applies in the event that the repellent is available as a powder as well as when the repellent involves microcapsules. Last, the repellent can also be easily incorporated, like the already previously mentioned aqueous or alcoholic solution, into the strip-making composition. This is because the substrate strip is advantageously a textile of fibers and/or filaments.

Typically, plastics such as polyester, polyamide, polyethylene, polypropylene, polyurethane, polyacetate or also natural materials such as cotton or viscose as well as mixtures are used as fibers or filaments for the substrate strip. The fibers in question and the plastic fibers produced from them, or cotton or viscose fibers can easily be provided with the repellent in regard to their strip-making composition. To do so, the repellent in question is added as a powder or also in a microencapsulated form, or as an aqueous or alcoholic solution to a plastic granulate for example, which is then in turn used to manufacture the desired fibers. This can be achieved by a known spinning nozzle fabrication process.

Adhesives based on acrylate, for example in the form of dispersions, have proven to be particularly favorable as conceivable adhesives. However, hot-melt adhesives based on acrylate and/or rubber as well as mixtures thereof are also conceivable.

In any event, the repellent in question can be incorporated in a particularly easy manner into the adhesive-making or strip-making composition. This applies in a particularly advantageous manner in the event that the repellent in question is present as a powder and is incorporated in this case for example in a granulate for manufacturing the adhesive and/or the fibers of the substrate strip. In this context, the invention recommends that the relevant repellent is present in the adhesive coating or in the substrate strip in a grammage ranging from 0.1% by weight to a maximum of 10% by weight. According to a particularly advantageous design, the percentage by weight of the repellent in the adhesive coating and/or strip is 0.5% by weight to 5% by weight, and in this case one can also work with a lower limit of 0.1% by weight. Most preferably, the percentage by weight of the repellent in the adhesive coating or in the substrate strip lies between 0.5% by weight and 2.5% by weight.

The invention hereby takes into account the fact that already low weight-percentage concentrations of the repellent in question in the adhesive coating or strip are sufficient to produce the desired olfactory or gustatory effect. In this context, capsaicin, in other words a paprika-based natural product, has proven to be particularly favorable and effective. This is because such a repellent is in fact often already perceived through the olfactory sense and results in mammal bites generally being prevented from the outset and the mammals in question correspondingly avoiding treated cables from the outset.

The invention hereby also assumes that the mammals to be typically repelled, such as weasels, have a good ability to learn so that most of the time, damage to the wrapped cables is not to be expected. This is because based on the mentioned mammals' ability to learn and the fact that nowadays engine compartment panels or also other plastic or rubber parts in the engine compartment are already equipped correspondingly, it is to be expected that the mammals are repelled as desired based on the scent of such wrapped cables in the automobiles. Therefore, generally the cables will not be damaged by a bite or scratch. This is the case all the more when weasels, for example, are likely also pass on learned behaviors to their progeny so that one can expect a particularly effective repulsion against mammal bites in particular.

Besides natural products as repellents, obviously other irritants can also be used, such as those based on cinnamic acid, aliphatic acid or also oleic acid. On the other hand, the advantageously used natural products are on hand for straightforward processing in a powder form, where particle sizes of less than 0.5 mm and particularly 200 µm and less are observed to allow one to easily add the repellent in question to the granulate for example or the adhesive-making or also the strip-making composition, and to incorporate it during production.

Due to the low percentage of the repellent in the adhesive coating or the substrate strip, taking into account a maximum of 10% by weight for the entire cable-wrapping tape, it is to be expected that processing of the adhesive-making or strip-making composition is practically not influenced compared to a procedure without the addition of a repellent. This applies similarly for the adhesive properties or the properties of the substrate strip in regard for example to tear strength and tearability by hand, and so on. In other words, as long as the repellent in question is present in the indicated grammage range, with a maximum percentage of 10% by weight, in the cable-wrapping tape in question, the mechanical properties of the relevant cable-wrapping tape are otherwise not or practically not influenced. In addition, the cable-wrapping tape in question can also be dyed for example. To do so, the dye particles as well as the repellent particles are incorporated into the plastic granulate to be processed as a composition from which the adhesive or the strip is made.

In terms of its substrate strip, the cable-wrapping tape produced in this manner has a surface weight of the typically used textile structure in a range of 20 $g/m^2$ to 500 $g/m^2$ and particularly 50 $g/m^2$ to 200 $g/m^2$. The thickness of the substrate strip is generally less than 0.8 mm. Preferably, thicknesses of less than 0.5 mm are used for the substrate strip.

The adhesive coating is thereby generally applied with an application weight ranging between about 20 $g/cm^2$ and 200 $g/cm^2$, and particularly in a range from about 50 $g/cm^2$ to 150 $g/cm^2$. As already described, synthetic rubber adhesives, hot-melt-based adhesives or acrylate-based adhesives (with or without solvents) are used as suitable adhesives. Silicone-, polyurethane-, polyether- and polyolefin-based adhesives are also conceivable.

In addition, after coating, the adhesives in question may be cross linked, for example radiation cross linked, if needed. Adhesives in a powder form, dispersion adhesives, general solvent-based adhesives and so on are also conceivable. To apply the adhesive or the adhesive coating, one generally works with a so-called contact-based direct coating. In addition, a transfer coating or also a contactless coating according to the "curtain coating" method are also conceivable.

The invention claimed is:
1. A cable-wrapping tape for wrapping cables in automobiles, the tape comprising:
  a substrate strip;

an adhesive coating on at least one face of the substrate strip; and a particulate mammal-bite repellent composed of a natural product, of a particle size of less than 0.5 mm, and incorporated into the cable-wrapping tape at a grammage of 0.1% to 10% by weight, the repellent being incorporated as a powder and/or in a microencapsulated form into a composition from which the adhesive is made.

2. The cable-wrapping tape according to claim 1, wherein the repellent is incorporated as a powder and/or in a microencapsulated form into a strip-making composition.

3. The cable-wrapping tape according to claim 1, wherein substances on the basis of paprika, pepper, or ginger are used as repellents.

4. A cable-wrapping tape for wrapping cables in automobiles, the tape comprising:

a textile substrate strip made of fibers or filaments;

an adhesive coating on at least one face of the substrate strip; and a particulate mammal-bite repellent composed of a natural product, of a particle size of less than 0.5 mm, and incorpoated into the cable-wrapping tape at a grammage of 0.1% to 10% by weight.

5. The cable-wrapping tape according to claim 4, wherein polyester, polyamide, polyethylene, polypropylene, polyurethane, polyacetate or also cotton or viscose as well as mixtures thereof are used as the fibers or filaments.

6. The cable-wrapping tape according to claim 1, wherein silicone-, polyurethane-, polyether-, and polyolefin-based adhesives and/or rubber- and/or acrylate-based hot-melt adhesives or dispersion adhesives are used as adhesive s in the adhesive coating.

* * * * *